United States Patent
Raffle et al.

(10) Patent No.: US 9,223,451 B1
(45) Date of Patent: Dec. 29, 2015

(54) ACTIVE CAPACITIVE SENSING ON AN HMD

(71) Applicant: Google Inc., Mountain View, CA (US)

(72) Inventors: Hayes Solos Raffle, Mountain View, CA (US); Timothy John Prachar, Mountain View, CA (US)

(73) Assignee: Google Inc., Mountain View, CA (US)

( * ) Notice: Subject to any disclaimer, the term of this patent is extended or adjusted under 35 U.S.C. 154(b) by 118 days.

(21) Appl. No.: 14/063,132

(22) Filed: Oct. 25, 2013

(51) Int. Cl.
*G06F 3/044* (2006.01)
*G06F 3/01* (2006.01)
*G06F 3/041* (2006.01)
*G06F 1/16* (2006.01)
*G02B 27/01* (2006.01)
*H01Q 1/27* (2006.01)

(52) U.S. Cl.
CPC .............. *G06F 3/044* (2013.01); *G02B 27/017* (2013.01); *G06F 1/163* (2013.01); *G06F 3/011* (2013.01); *G06F 3/0416* (2013.01); *G02B 2027/0178* (2013.01); *H01Q 1/273* (2013.01)

(58) Field of Classification Search
CPC .................................. G06F 3/044; G06F 1/163
See application file for complete search history.

(56) References Cited

U.S. PATENT DOCUMENTS

2002/0185999 A1* 12/2002 Tajima et al. ............. 324/76.75
2004/0155860 A1* 8/2004 Wenstrand et al. ........... 345/156
2009/0225036 A1* 9/2009 Wright ........................ 345/173
2011/0061949 A1* 3/2011 Krah et al. ................. 178/18.06
2011/0194029 A1* 8/2011 Herrmann et al. ............ 348/569
2011/0196617 A1* 8/2011 Petrucelli ........................ 702/19
2012/0105333 A1 5/2012 Maschmeyer et al.
2013/0113715 A1 5/2013 Grant et al.
2013/0165215 A1 6/2013 Arezina et al.
2013/0181888 A1* 7/2013 Kuriya et al. ...................... 345/8
2014/0028577 A1* 1/2014 Krah et al. .................... 345/173
2014/0239984 A1* 8/2014 Alameh et al. ................ 324/686
2015/0062022 A1* 3/2015 Rabii ........................... 345/173

FOREIGN PATENT DOCUMENTS

EP            2619641       7/2013
WO         2013088725      6/2013

* cited by examiner

*Primary Examiner* — Sanjiv D Patel
(74) *Attorney, Agent, or Firm* — McDonnell Boehnen Hulbert & Berghoff LLP

(57) ABSTRACT

Embodiments described herein may allow for the use of active capacitive sensing on a head-mountable device. An example method may involve: sending a first signal that has a first frequency from a signal transmitter positioned on a wearable computing device so that when the wearable computing device is worn, the signal transmitter couples to a part of a wearer of the wearable computing device, receiving a second signal at a capacitive sensor located on the wearable computing device, determining whether the second signal has the first frequency, if the second signal has the first frequency, outputting a third signal that is indicative of manual input on the capacitive sensor, and if the second signal does not have the first frequency, refraining from outputting the third signal.

21 Claims, 14 Drawing Sheets

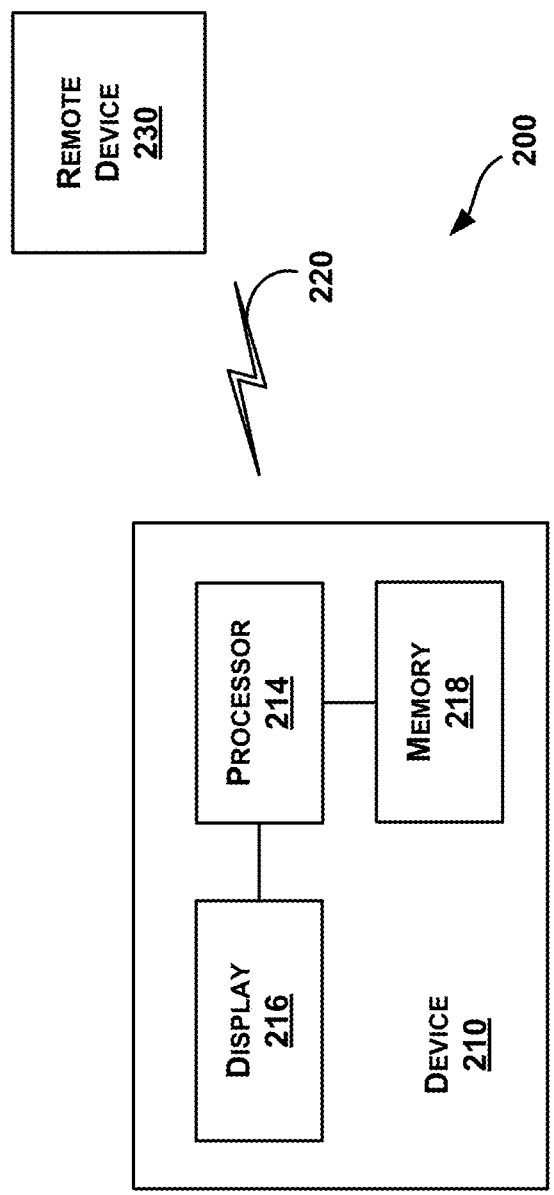

ACTIVE CAPACITIVE SENSING ON AN HMD

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears substantially further away, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or occupy only a portion of a wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

Example embodiments may allow for active capacitive sensing on a wearable computing device, such as a head-mountable device (HMD). A signal transmitter may be positioned on the device so that when the device is worn, the signal transmitter couples to a part of a wearer of the device. A first signal with a first frequency may be sent from the signal transmitter. A capacitive sensor located on the device may receive a second signal. It may be determined whether the second signal has the first frequency. If the second signal has the first frequency, a third signal indicating manual input on the capacitive sensor may be output. If the second signal does not have the first frequency, the third signal may not be output.

In one aspect, a method may involve: sending a first signal that has a first frequency from a signal transmitter positioned on a wearable computing device so that when the wearable computing device is worn, the signal transmitter couples to a part of a wearer of the wearable computing device, receiving a second signal at a capacitive sensor located on the wearable computing device, determining whether the second signal has the first frequency, if the second signal has the first frequency, outputting a third signal that is indicative of manual input on the capacitive sensor, and if the second signal does not have the first frequency, refraining from outputting the third signal.

In another aspect, a wearable computing device may involve: a signal transmitter positioned on the wearable computing device so that when the wearable computing device is worn, the signal transmitter couples to a part of a wearer of the wearable computing device, a capacitive sensor, and a control system. The control system may be configured to: cause the signal transmitter to send a first signal that has a first frequency, receive a second signal at the capacitive sensor, determine whether the second signal has the first frequency, if the second signal has the first frequency, output a third signal that is indicative of manual input on the capacitive sensor, and if the second signal does not have the first frequency, refrain from outputting the third signal.

In another aspect, a non-transitory computer readable medium has stored therein instructions executable by a wearable computing device to cause the wearable computing device to perform functions comprising: sending a first signal that has a first frequency from a signal transmitter positioned on the wearable computing device so that when the wearable computing device is worn, the signal transmitter couples to a part of a wearer of the wearable computing device, receiving a second signal at a capacitive sensor located on the wearable computing device, determining whether the second signal has the first frequency, if the second signal has the first frequency, outputting a third signal that is indicative of manual input on the capacitive sensor, and if the second signal does not have the first frequency, refraining from outputting the third signal.

In yet another aspect, example embodiments may provide for: means for sending a first signal that has a first frequency from a signal transmitter positioned on a wearable computing device so that when the wearable computing device is worn, the signal transmitter couples to a part of a wearer of the wearable computing device, means for receiving a second signal at a capacitive sensor located on the wearable computing device, means for determining whether the second signal has the first frequency, if the second signal has the first frequency, means for outputting a third signal that is indicative of manual input on the capacitive sensor, and if the second signal does not have the first frequency, means for refraining from outputting the third signal.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 2 is a simplified block diagram of a computing device according to an example embodiment.

DETAILED DESCRIPTION

Figure 1A:
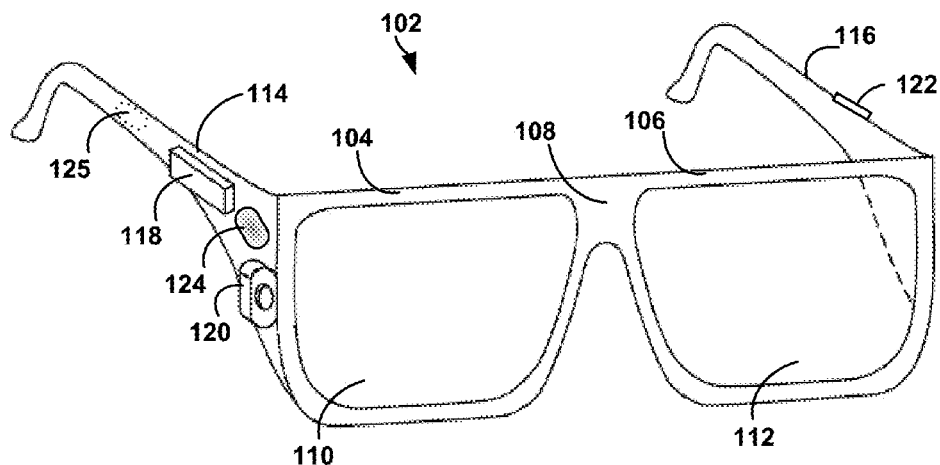
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

A touchpad (or "trackpad") is a user interface featuring a tactile sensor that can translate the position of a user's fingers to a relative position on a display. Touchpads may be useful in a variety of computing devices, including HMD's (head-mounted displays). HMD's often use touchpads that operate using mutual capacitance, where measurements are performed using two layers of electrodes, each forming a grid. The touchpads may detect touch input using the mutual capacitance between the two layers of electrodes. A map of capacitance measurements may first be determined for each row-column intersection of the grid. Then, when a user's finger touches a point on the grid, the mutual capacitance of the two electrodes at that point may decrease, allowing the touchpad to identify the touch.

Touchpads that operate using mutual capacitance may not be able to differentiate between different users that touch the touchpad. In some applications, particularly with respect to HMD's or other wearable computing devices, it may be useful to be able to distinguish touches from different individuals. In particular, it may be desirable to only have the touchpad operate when the wearer of the device is the one that is touching the touchpad. Additionally, it may also be desirable to only have the touchpad operate when a user is wearing the device (as opposed to holding the device, for instance).

An alternative approach to using mutual capacitance is to use a touchpad that operates using self-capacitance. Rather than measuring the capacitance between two conductors, a touchpad using self-capacitance measures the capacitance of a single conductor, which may be affected by nearby objects. When an external grounded object such as a human finger approaches a conductor, such as an electrode of a touchpad, additional charge may be attracted to the electrode and the self-capacitance of the electrode may increase, allowing the touch to be detected.

Example embodiments use active capacitive sensing to detect manual user input at a capacitive sensor, such as at a touchpad that operates using self-capacitance, located on a wearable computing device. An active signal with a chosen frequency may be sent by a signal transmitter located on a wearable computing device such as an HMD. The signal transmitter may be positioned on the HMD so that when the device is being worn, the signal transmitter couples to a part of a wearer of the device. For example, the signal transmitter may be positioned along the inside of a side-arm of the HMD, on an earpiece of the HMD, or near a nosepiece of the HMD.

The signal transmitter may generate a signal at a chosen frequency that travels through the wearer of the HMD, and thus affects the capacitance. The signal transmitter may be a conductor, such as an electrode, that is driven by a low voltage radio frequency (typically low enough to be considered safe for a human). The body of the wearer may be sufficiently conductive at the chosen frequency so that the signal may travel through the wearer's body and into the wearer's hands and fingers. In some examples, multiple signal transmitters at separate locations may be used to generate a stronger signal and/or for redundancy in case one or more of the transmitters breaks or fails to couple to the wearer of the device.

One or more signals may then be received by a capacitive sensor, such as a touchpad operating using self-capacitance, located on the HMD. The signals may be filtered to identify signals with the chosen frequency. When a signal with the chosen frequency is detected, the HMD may have identified a manual input from the wearer of the device, who may be touching the touchpad with her finger or fingers. The HMD may then output a signal indicating manual input on the touchpad. This signal may be used to control the device in a variety of ways. For instance, the position of the wearer's fingers may be translated to a relative position on a display of the device, such as to control the location of a graphical element.

In some examples, the signal-to-noise ratio (SNR) of the touchpad may be improved by filtering out signals with frequencies that don't match the chosen frequency. Additionally, false positives from touches by individuals who are not wearing the device may be filtered out because their signals won't match the chosen frequency. To avoid false positives when another individual touching the touchpad is also in direct physical contact with the HMD wearer, the signals may also be filtered based on signal strength. A signal sent through skin-to-skin contact from one person to another person may be weaker, allowing the signal to be filtered out. Additionally, false positive touches resulting when the HMD user touches the touchpad while not actually wearing the device may also be filtered out, such as when a user picks up the HMD to put it on.

In further examples, the capacitive sensing may allow for three-dimensional (3D) sensing above the touchpad (i.e., detecting hand position in the Z direction in addition to the X and Y directions). In other examples, non-contact gestures and/or "hover" input when the user hovers her hand over the touchpad may be detected. This type of input may be useful for improving the mapping of input from the touchpad to a virtual image on a display, such as by smoothing the translation by predicting where a user may touch the touchpad next. In further examples, a different type of capacitive sensor may be used. For instance, instead of a touchpad, a single electrode or multiple electrodes at different locations on the HMD may be used.

It should be understood that the above embodiments and others described herein are provided for purposes of illustration, and are not intended to be limiting. Variations on the above embodiments and other embodiments are possible, without departing from the scope of the invention as set forth by the claims.

II. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
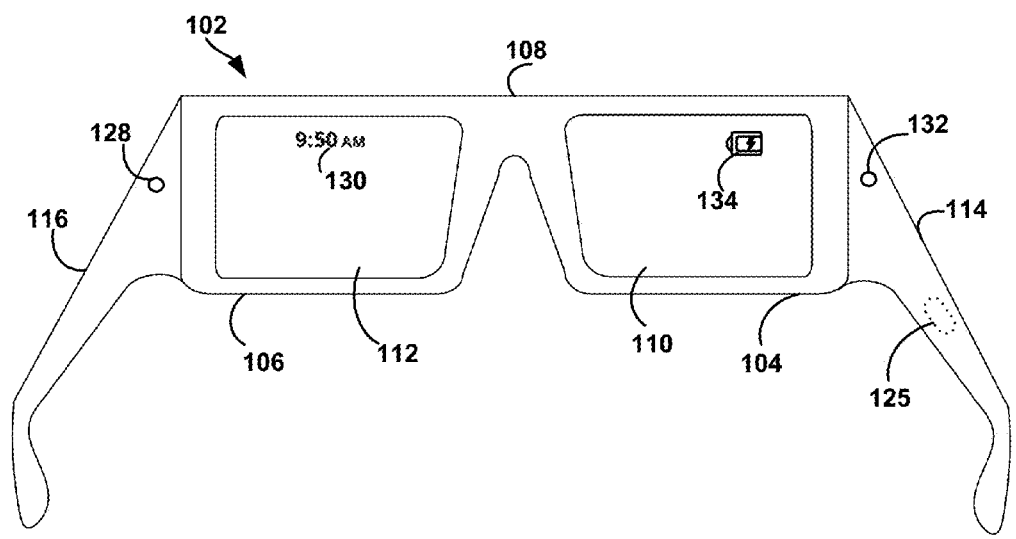
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
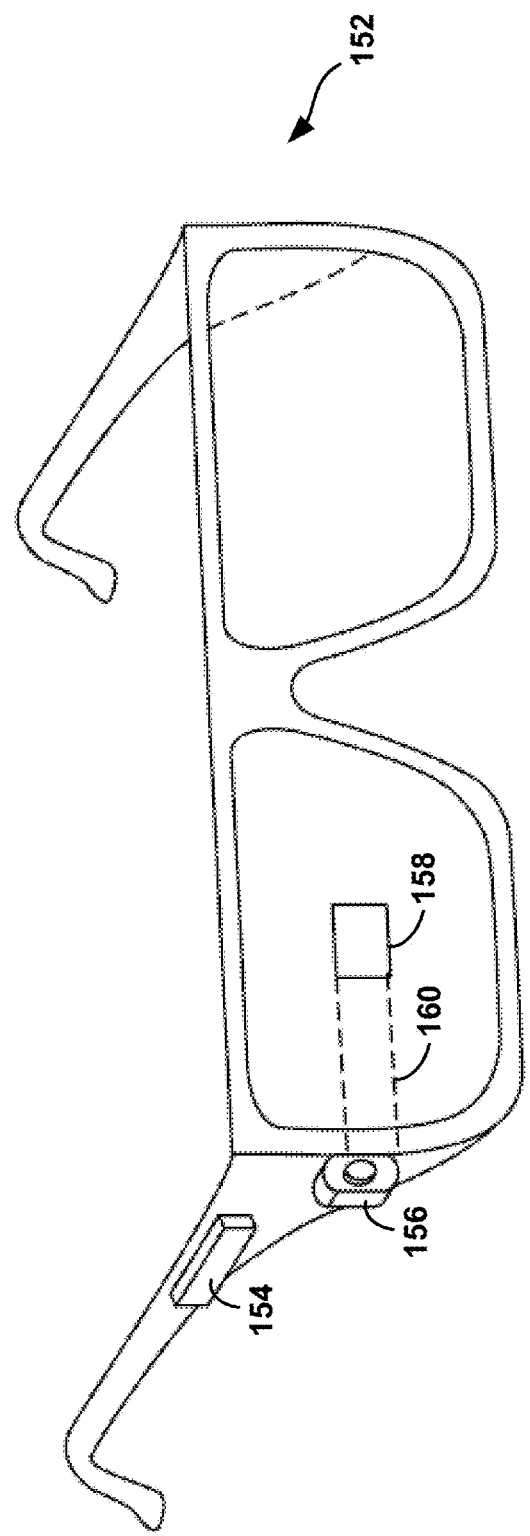
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
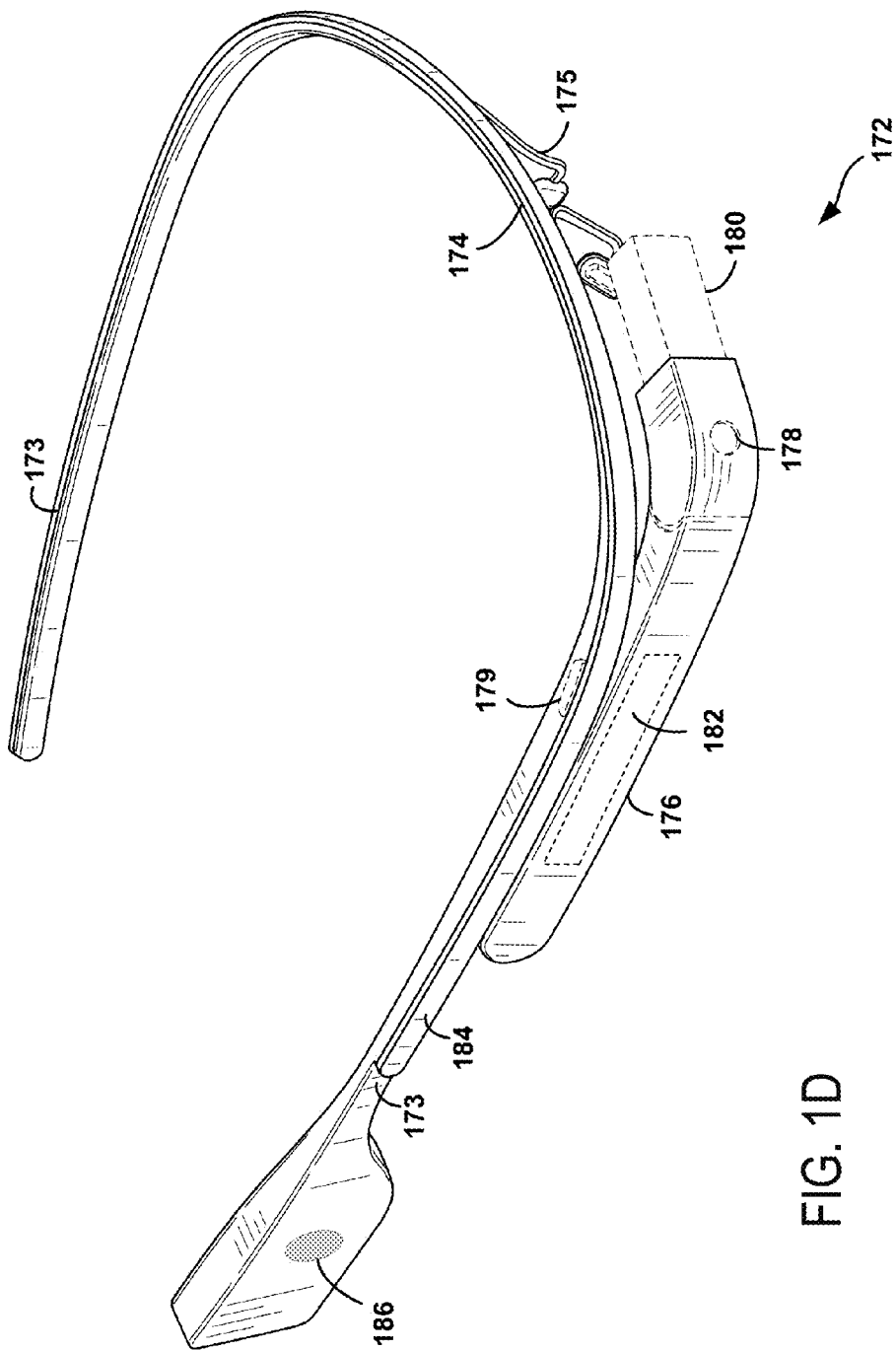
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a side-mounted touchpad 182 and a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
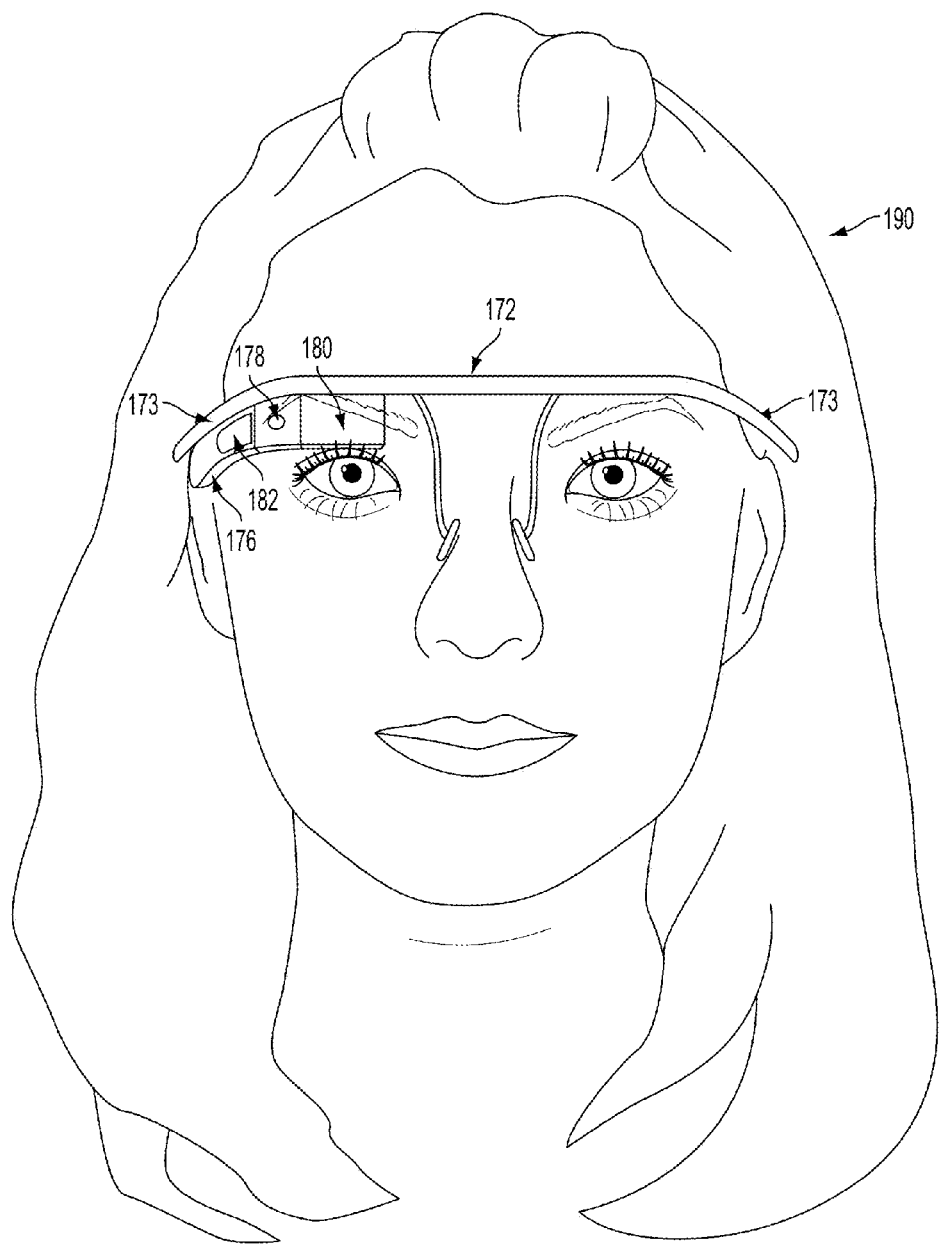
FIGS. 1E to 1G are simplified illustrations of the wearable computing system shown in FIG. 1D, being worn by a wearer.
Figure 1F:
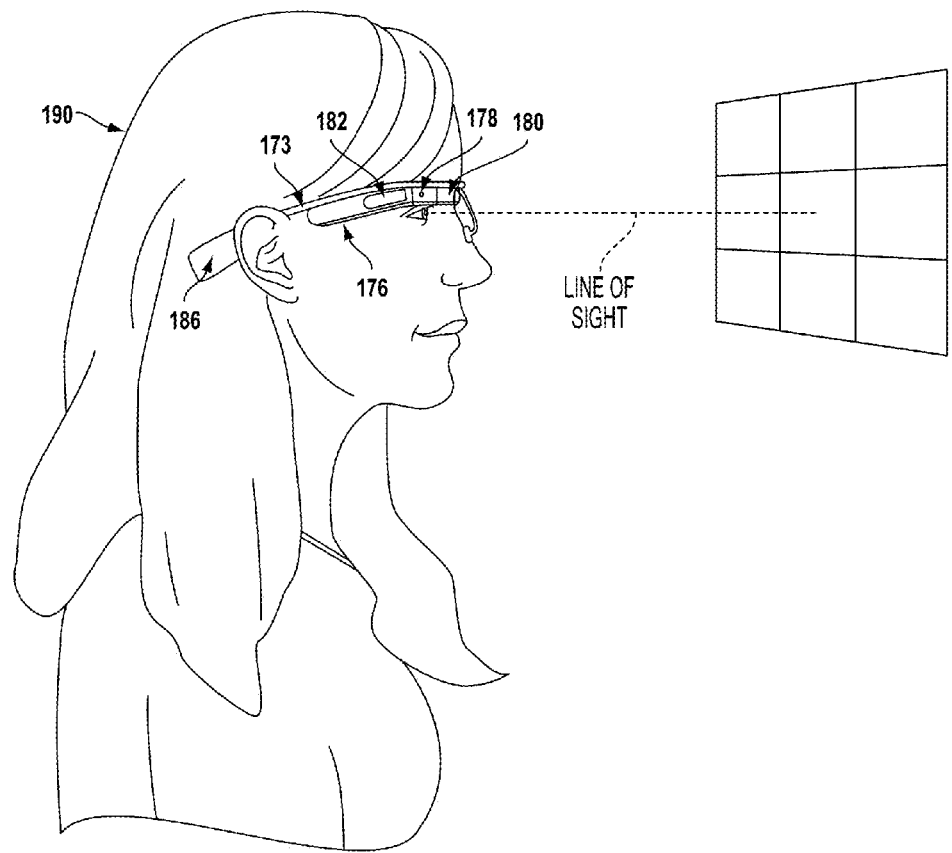
Figure 1G:
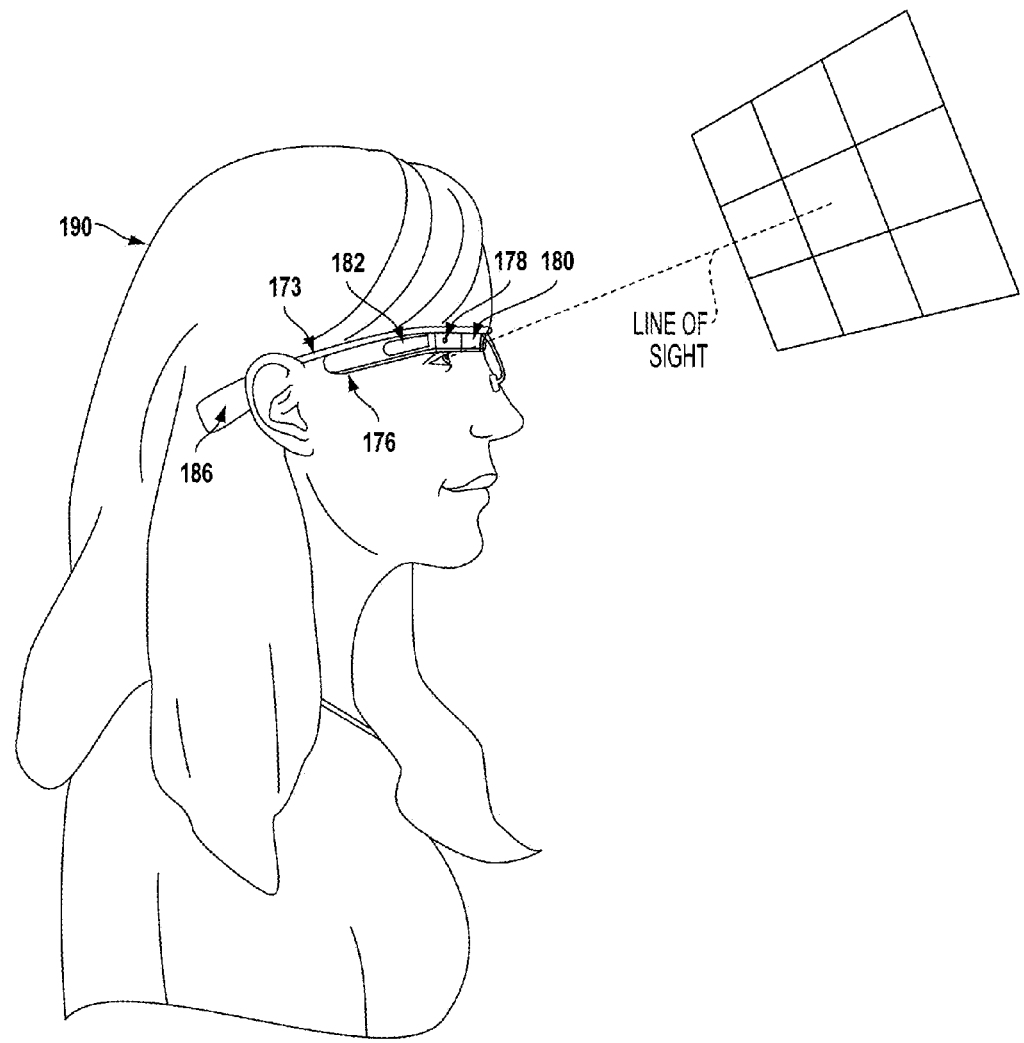

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

FIG. 2 is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. Example Methods

Figure 3:
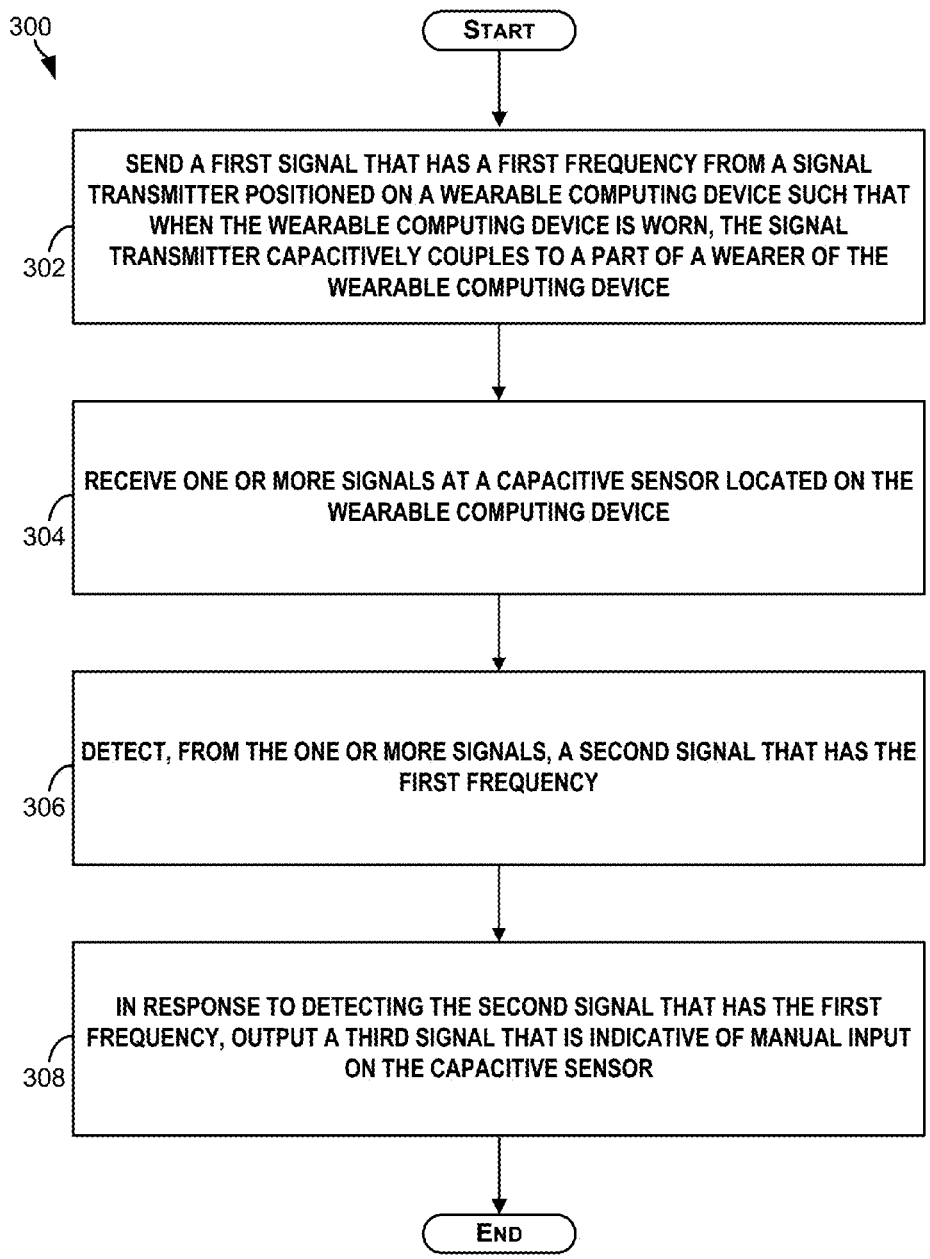
FIG. 3 is a flow chart illustrating a method, according to an example embodiment.

FIG. 3 is a flow chart illustrating a method 300, according to an example embodiment. Illustrative methods, such as method 300, may be carried out in whole or in part by an HMD, such as the head-mountable devices shown in FIGS. 1A to 1G. Method 300 may be carried out by components of an HMD, such as a control system. Such a control system may include, for example, a processor and program instructions stored on a non-transitory computer-readable medium. However, an HMD's control system may additionally or alternatively include other components. Further, an example method or portions thereof may be carried out by components of an HMD other than a control system. Yet further, an example method, or portions thereof, may be carried out by a computing device that is in communication with an HMD. An example method may also be carried out by other types of computing devices and/or combinations of computing devices including other types of wearable computing devices as well.

As shown by block 302, method 300 may involve sending a first signal that has a first frequency from a signal transmitter located on a wearable computing device, such as an HMD. The signal transmitter may be positioned on the wearable computing device such that when the device is worn, the signal transmitter couples to a part of a wearer of the device. The method 300 may further involve receiving a second signal at a capacitive sensor located on the wearable computing device, as shown by block 304. The method 300 may further involve determining whether the second signal has the first frequency, as shown by block 306. If the second signal has the first frequency, the method 300 may further involve outputting a third signal that is indicative of manual input on the capacitive sensor, as shown by block 308. If the second signal does not have the first frequency, the method 300 may further involve refraining from outputting the third signal, as shown by block 310.

A wearable computing device may contain a signal transmitter that couples to a part of a wearer of the device. For instance, the computing device may be an HMD. The signal transmitter may be positioned on the HMD so that it touches, or comes close to, a user who is wearing the device. The location of the signal transmitter may be chosen so that the signal may travel through a user who is wearing the device, and also so that the signal is unlikely to reach another individual who is not wearing the device.

Figure 4A:
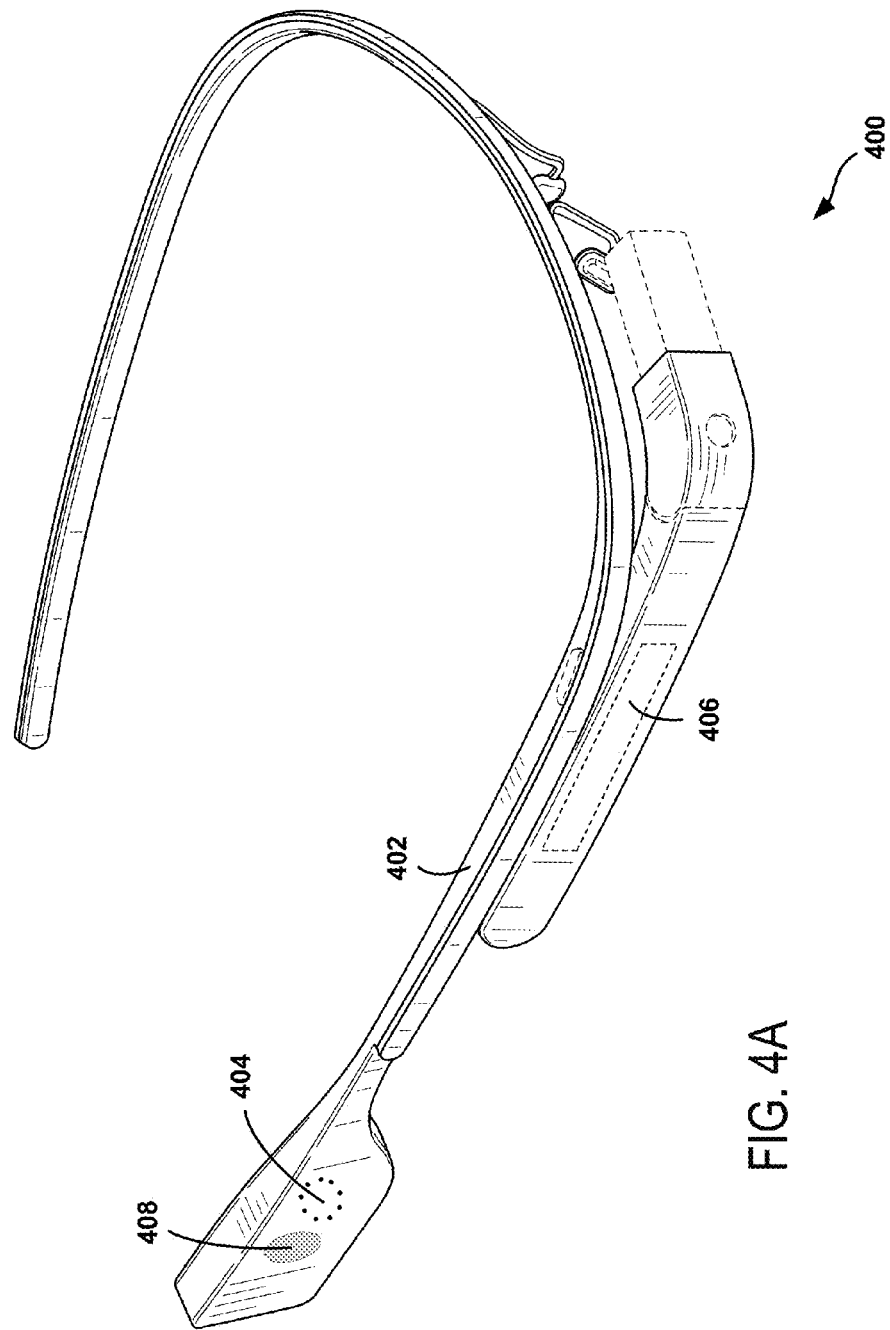
FIG. 4A illustrates an HMD with a signal transmitter, according to an example embodiment.

FIG. 4A shows an HMD that contains a signal transmitter, according to an example embodiment. As shown, a first side-arm 402 of an HMD 400 may contain a signal transmitter 404, such as an electrode driven by a chosen frequency, which may be positioned along the inside of the side-arm 402. In some examples, the HMD 400 may additionally contain a capacitive sensor, such as a self-capacitance touchpad 406, located along the outside of the side-arm 402 of the HMD 400. In this example, the signal transmitter 404 is shown located on an earpiece of the HMD 400 near a BCT 408. The signal transmitter 404 could be located at other places on the HMD 400 as well.

Figure 4B:
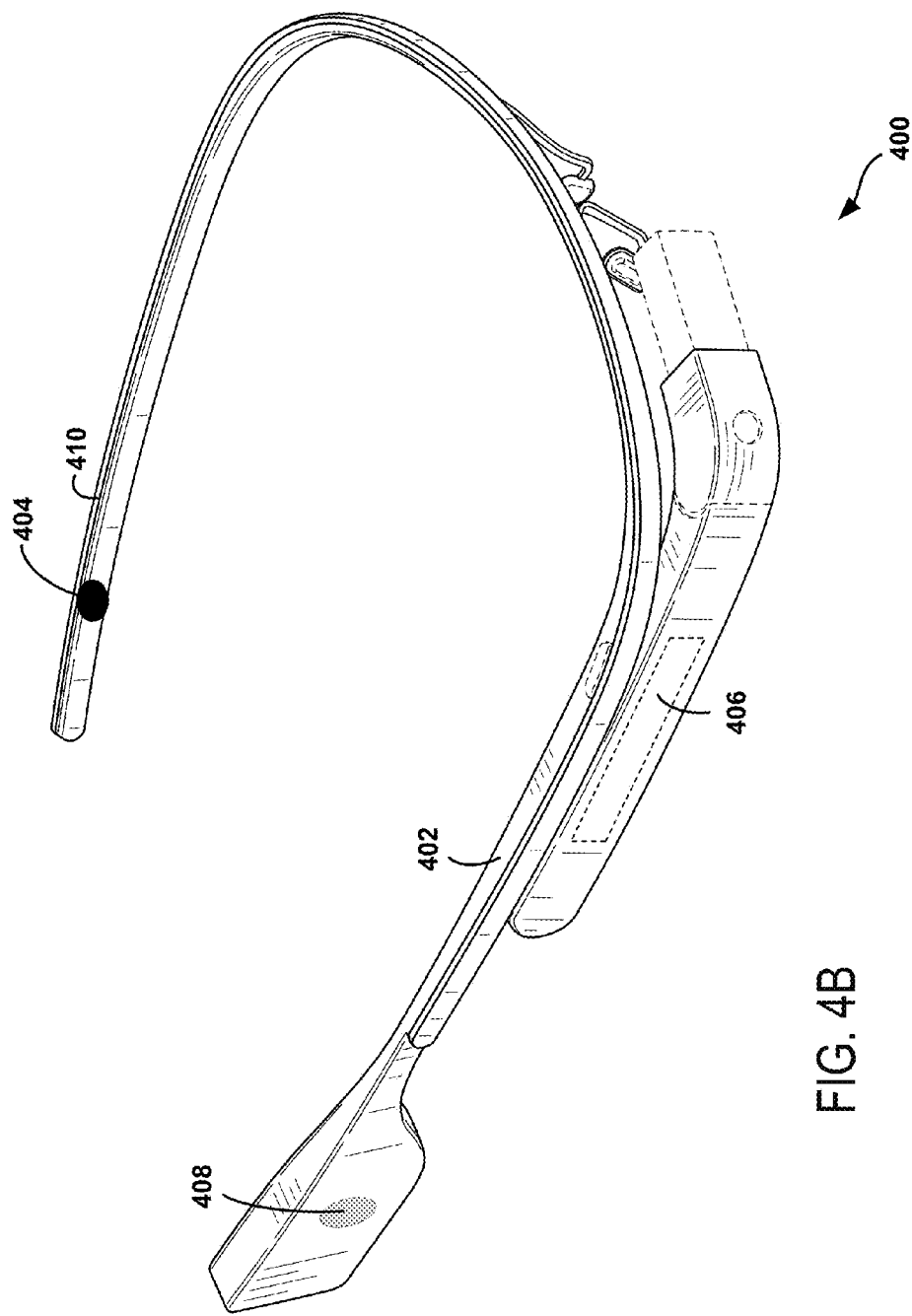
FIG. 4B illustrates an alternative configuration of an HMD with a signal transmitter, according to an example embodiment.

In some configurations, it may be advantageous to position the signal transmitter on a side-arm opposite the side-arm containing the capacitive sensor as shown in FIG. 4B to avoid interference that may be caused by placing the signal transmitter and the capacitive sensor close together. In this example, the capacitive sensor 406 is positioned along a first side-arm 402 of the HMD 400 and the signal transmitter 404 is positioned along a second side-arm 410 of the HMD 400. Other configurations are also possible.

Method 300 may involve sending a first signal that has a first frequency from the signal transmitter, as shown by block 302. The signal transmitter may be capable of transmitting a chosen low-frequency radio frequency (RF) signal. For instance, the signal transmitter may be a conductor such as an electrode driven by a low voltage power source, such as an alternating current (AC) power supplier. In some examples, multiple transmitting electrodes may be used at one or more different locations on the computing device. Additionally, a variety of different types and sizes of electrode(s) could be used as well.

In further examples, the conductive material making up the electrode(s) of the signal transmitter 404 in FIG. 4A may be inserted on an external or internal surface of a side-arm 402 of the HMD 400. Alternatively, the conductive material may be layered, with one layer along the outside of the side-arm 402 and an additional layer along the inside of the side-arm 402. Further, the electrode(s) of the signal transmitter 404 may be positioned to directly contact a part of a wearer of the HMD 400 or the electrode(s) of the signal transmitter 404 may be placed below a capacitive surface through which RF signals can be transmitted. Other possibilities for inserting electrode(s) of the signal transmitter 404 exist as well, depending on the desired interface.

The electrode(s) of the signal transmitter may be driven by a low voltage power source to generate a low frequency RF signal. The frequency may be chosen to be low enough so that it can safely pass through a human (i.e., orders of magnitude lower than a signal that could create any safety risk). When the HMD is being worn by a user, the signal transmitter may couple to the user so that the signal passes through the user's body. Additionally, a frequency of the signal may be chosen at which a human body may be highly conductive. Accordingly, the signal may pass from the signal transmitter through the user's body and into her hands and fingers.

Figure 5A:
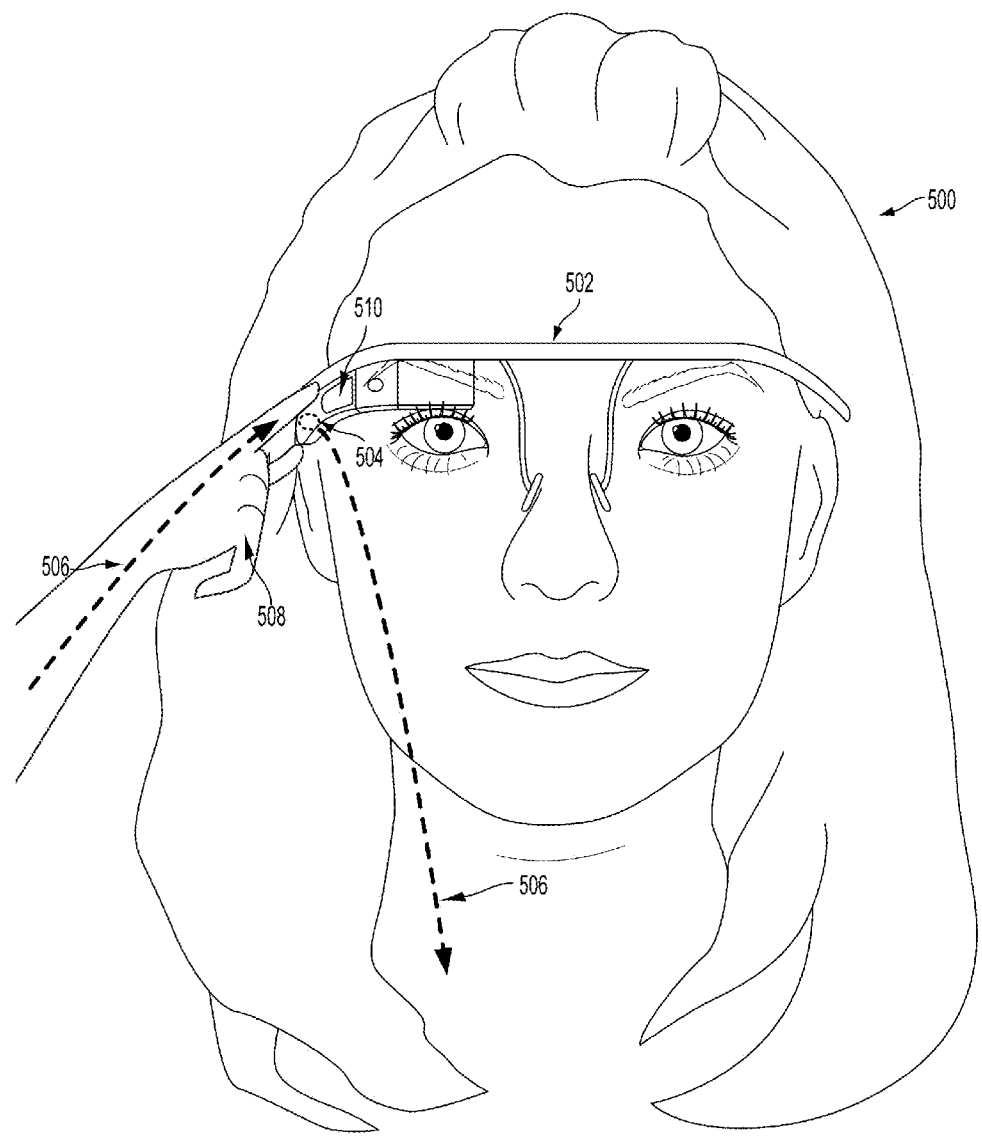
FIG. 5A illustrates operation of the HMD from FIG. 4A, according to an example embodiment.

FIG. 5A shows a signal being transmitted through a user of an HMD, according to an example embodiment. As shown, a user 500 may be wearing a wearable computing device, such as an HMD 502. The HMD 502 may contain a signal transmitter 504, such as a conductor driven by an AC power source. The signal transmitter 504 may couple to a portion of the user 500's body, such as the side of her head. The signal transmitter 504 is shown in FIG. 5A near the earpiece of the HMD 502 on the same side as a touchpad 510, but the signal transmitter 504 could be located at other positions on the HMD 502 as well. A control system may cause the signal transmitter 504 to transmit a signal 506 through the user's body, as shown in the figure. The control system could be located on the HMD 502, it could be a separate computing system in communication with the HMD 502, or a combination of the two.

Method 300 may further involve receiving a second signal at a capacitive sensor located on the wearable computing device, as shown by block 304. The capacitive sensor may contain one or more electrodes that may be used to detect signals from a grounded object, such as a human finger. For example, the capacitive sensor could be a touchpad operating using self-capacitance. When a user touches the touchpad at a certain point, additional charge may be attracted to one or more electrodes of the touchpad located near that point. The touchpad may be able to determine that the self-capacitance of those electrodes has increased, which may allow the touch to be detected. Some example touchpads may only be able to detect signal touches while other example touchpads may be able to detect multiple separate touches simultaneously.

Referring to FIG. 5A, the signal 506 may be transmitted at a chosen low frequency so that the signal 506 can safely pass through the user 500. Additionally, the frequency of the signal 506 may be chosen at which the body of the user 500 is highly conductive. Accordingly, the body of the user 500 may effectively function as an extension of the signal transmitter 504. The signal 506 may travel through the body of the user 500 and into the user's hand 508. One or more of the user 500's fingers may be in contact with a capacitive sensor, such as a touchpad 510, located on the HMD 502. As a result, the user may cause a signal 506 to be received at the touchpad 510.

Other signals may also be received by the touchpad 510 located on the HMD 502. For instance, another person, animal, or object may come close to or come into contact with the touchpad 510. These things could also cause additional charge to be attracted to electrodes of the touchpad 510. As another example, the owner of the HMD 502 may touch the touchpad 510 while not wearing the HMD 502. For instance, the owner may pick up the HMD 502 to put it on, and one or more of her fingers may come into contact with the touchpad 510.

In some applications, it may be desirable to filter out signals that don't come from a user who is actually wearing the device. For instance, the touchpad 510 of the HMD 502 may be used to control a visual display of the HMD 502. If somebody other than a user wearing the device touches the touchpad 510, the individual may not be able to see the effects on the visual display. Accordingly, it may be desirable to treat these touches as noise which should not be used to control the device and/or a visual display of the device.

Method 300 may further involve determining whether the second signal that has the first frequency, as shown by block 306. In order to filter out signals caused by something other than a user who is wearing the device, received signals may be filtered based on frequency. If a user who is wearing the device touches the touchpad, a signal with the same frequency as the signal transmitted by the signal transmitter may be detected. For instance, a control system may filter incoming signals so that the capacitive sensor has a narrow band response centered at the frequency used by the signal transmitter.

By filtering incoming signals in order to detect signals with the same frequency as the transmitted signal, interference from ambient electromagnetic background may also be reduced or eliminated. Accordingly, a self-capacitance touchpad using the disclosed methods may have a better signal-to-noise ratio (SNR) than traditionally used mutual capacitance touchpads. A better SNR may allow for more precise control of user interfaces that are dependent on input from the touchpad. In some applications, a better SNR may be particularly valuable for HMD's and other devices where the input space (the touchpad) and the output space (a visual display) do not coincide. More precise SNR's may allow the input to be translated to a relative position on the display more accurately.

In some applications, a capacitive sensor that allows for three-dimensional sensing may be used. For instance, a standard touchpad may only report the location of touches in the X- and Y-directions. A touchpad with a better SNR may be able to report the location of manual input in the Z-direction (i.e., distance of a user's hand or finger from the touchpad) as well.

Figure 5B:
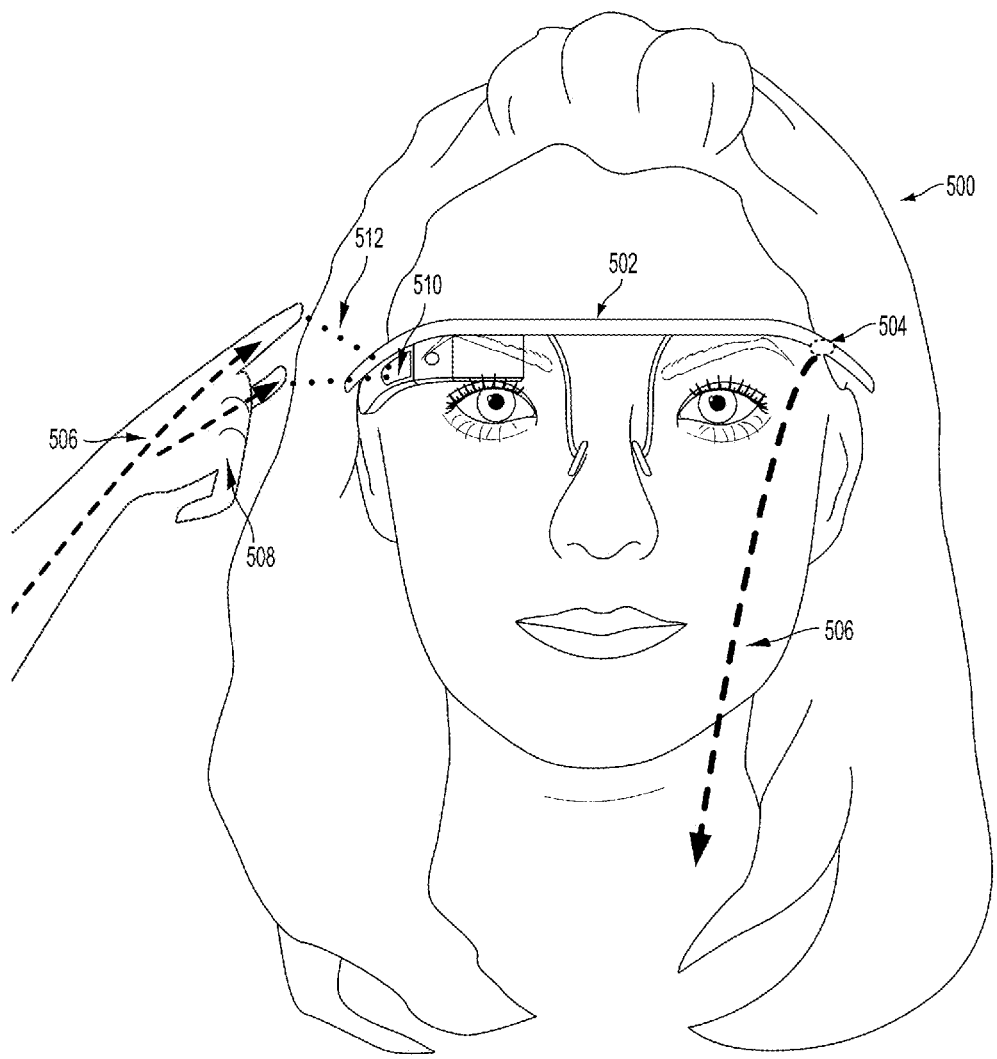
FIG. 5B illustrates operation of the HMD from FIG. 4B, according to an example embodiment.

FIG. 5B shows detection of three-dimensional input, according to an example embodiment. A signal 506 with a chosen frequency may be sent through a wearer 500 of an HMD 502 from a signal transmitter 504. The signal transmitter 504 is shown in FIG. 5B on an opposite side of the HMD 502 from the touchpad 510, but the signal transmitter 504 could be located at other positions on the HMD 502 as well. As shown in the figure, the signal 506 may travel through the wearer 500's body and into the fingers of the wearer's hand 508. The touchpad 510 may be able to detect the location of the wearer's fingers in space by determining the distance 512 from one or more of the wearer's fingers to one or more electrodes of the touchpad 510. The distance 512 may be determined based on the strength of the received signal (the received signal may increase as the wearer's fingers get closer to the touchpad 510).

In further examples, the capacitive sensor may be able to detect one or more non-contact gestures by the user. For example, the sensor may be used to detect when a user waves her hand past the sensor, taps the sensor, or positions her fingers over the sensor to hold the device. Additionally, the capacitive sensor may be able to detect hover input indicating that the user is hovering over the touchpad with one or more of her fingers. For instance, signals up to a certain threshold level of strength may be treated as hover input signals. Once the strength crosses the threshold, the input signals may be treated as touch signals, indicating that the wearer is actually touching the touchpad and/or is very close to touching the touchpad.

In additional examples, signals may be filtered out if they don't reach a certain threshold level of strength. For instance, if another individual is in physical contact with the wearer of the device, the signal from the signal transmitter may also travel into the other individual's body. However, the strength of the signal may be significantly weaker in the other individual's body, depending on the amount of contact between the two individuals. Accordingly, by filtering out weaker received signals, false positives from when another individual in physical contact with a wearer of the device touches or approaches the capacitive sensor may also be prevented.

In further examples, the threshold level of strength could be adaptively controlled based on historical data, such as historical data indicating the strength of signals received at the capacitive sensor that passed through the wearer of the device. For instance, it may be determined that signals passing through a particular wearer of the device fall within a certain range of strength levels. Then, when a signal is received at the capacitive sensor with a strength level that falls outside the historical range, the signal may be identified as a false positive and filtered out.

In additional examples, signals may be filtered out if they aren't received within a certain amount of time after a signal was sent. For instance, the signal sent from the signal transmitter may be pulsed at a certain predetermined interval. It may be determined that signals typically take a certain amount of time to pass through the body of a wearer of the device to reach the capacitive sensor. Accordingly, only those signals which are received within a predicted window of time may be treated as possible touch signals, and signals received at other times may be filtered out.

If the second signal has the first frequency, method 300 may further involve outputting a third signal that is indicative of manual input on the capacitive sensor, as shown by block 308. The third signal may be used by a control system of the HMD or a different system in order to operate the device based on the user input. In some example, the third signal may be used to translate a position that is being touched on the touchpad to a relative position on a display of the device. For instance, the signal may be used to control the location of a pointing device on a visual display.

In additional examples, three-dimensional input over the touchpad may be determined, representing distance to the touchpad, as shown in FIG. 5B. Accordingly, different functions may be carried out depending on the distance of the user's fingers from the touchpad. For instance, if a user is hovering her hand over the touchpad, the hover input may be used to predict where the user is likely to touch the touchpad next. If the touchpad controls a pointing device on a visual display, the hover input may be used to smooth the translation of the location on the touchpad to a location on the visual display in between touches to the touchpad. In alternative examples, one or more warm-up functions may be performed based on hover input. For instance, a touch to a capacitive sensor may be used to control a camera, and when the user hovers over the sensor, the camera may be warmed up so that the camera is ready to take a picture if the user touches the sensor. The input signal could be used to control the device in a wide variety of other ways, as well.

If the second signal does not have the first frequency, method 300 may further involve refraining from outputting the third signal, as shown by block 310. Accordingly, signals generated by a person or object other than the wearer of the device may not be used to control the device's behavior. Additionally, ambient noise may also be filtered out, which may improve the SNR of the capacitive sensor.

IV. Alternative Configurations

Example embodiments could use a variety of different configurations of the signal transmitter as well as the capacitive sensor on wearable computing devices. For instance, the signal transmitter and the capacitive sensor could be placed at different locations on an HMD, depending on the desired interface. The amount, size, and type of conductive material used for each can be varied as well.

Figure 6A:
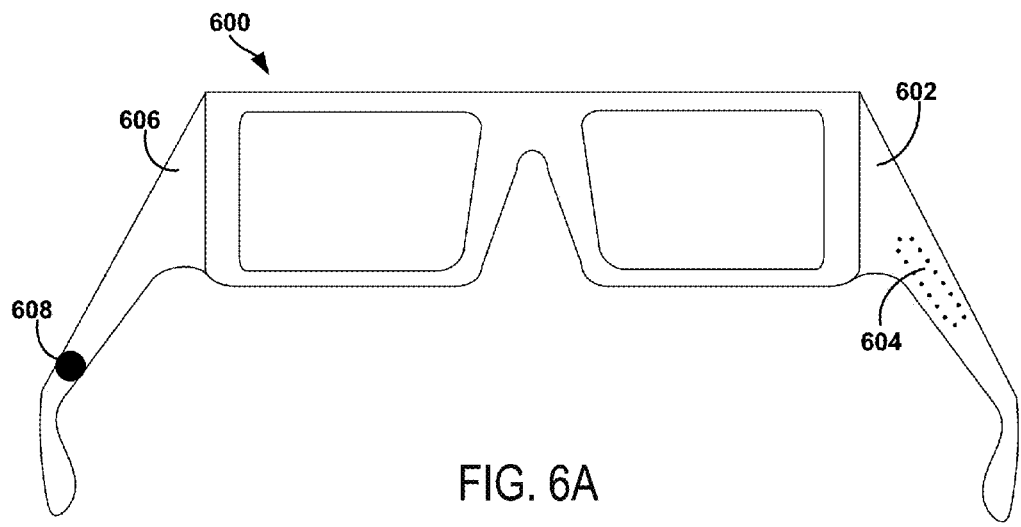
FIG. 6A illustrates an HMD with a signal transmitter in a different location, according to an example embodiment.

FIG. 6A shows an alternative HMD configuration, according to an example embodiment. An HMD 600 may contain a signal transmitter 608 located near the earpiece along the inside of a first side-arm 606. It may be determined that this location is likely to allow for the signal transmitter 608 to capactively couple to a wearer of the HMD 600. The HMD may additionally contain a capacitive sensor, such as a touchpad 604, located on the outside of a second side-arm 602 of the HMD.

Figure 6B:
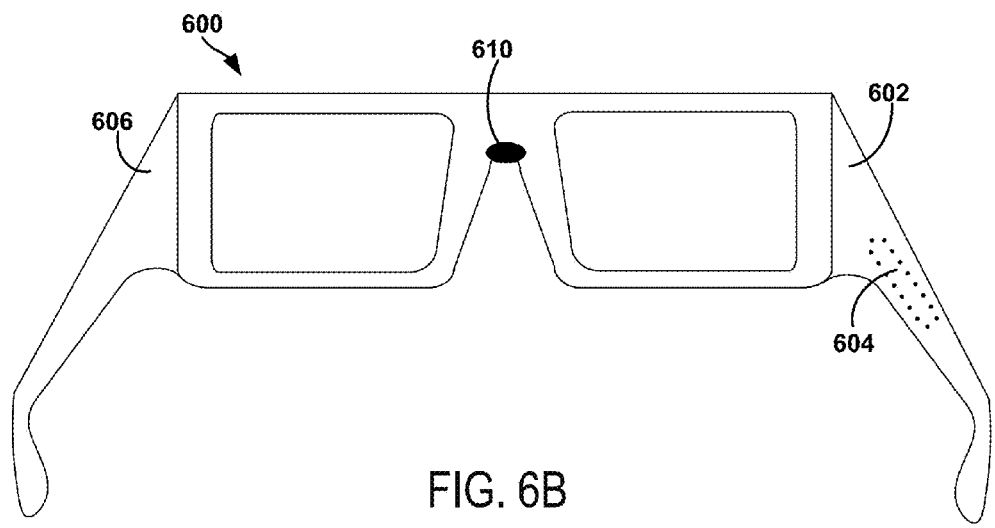
FIG. 6B illustrates an HMD with a signal transmitter in another different location, according to an example embodiment.

FIG. 6B shows another HMD configuration, according to an example embodiment. As shown, an HMD 600 may contain a signal transmitter 610 located near the nosepiece. In some examples, it may be determined that this location is preferable. For instance, in some devices, the nosepiece may stay more securely attached to the wearer than other parts of the device. The HMD 600 may also have a touchpad 604 located on the outside of one of the side-arms 602 of the HMD 600.

Figure 6C:
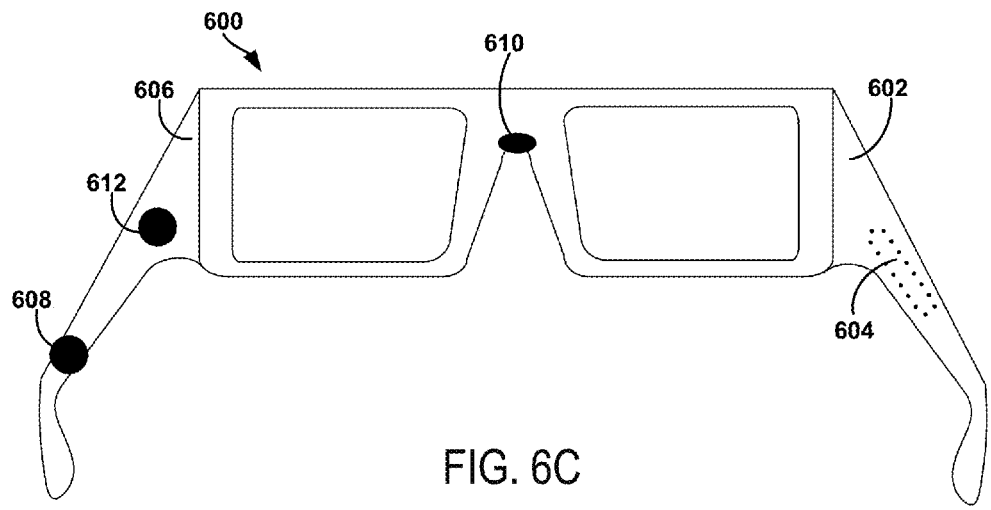
FIG. 6C illustrates an HMD with multiple signal transmitters at different locations, according to an example embodiment.

In additional examples, multiple signal transmitters at separate locations on a wearable computing device may be used. For instance, as shown in FIG. 6C, a first signal transmitter 608 may be placed along the inside of a side-arm 606 of an HMD 600. Furthermore, a second signal transmitter 610 may be placed near the nosepiece of the HMD 610. Additionally, a third signal transmitter 612 may be placed at a different point along the inside of the side-arm 606 of the HMD 600, such that it couples to a wearer near the wearer's temple. The HMD 600 may also have a touchpad 604 located on the outside of the opposite side-arm 602 of the HMD 600.

Each of the signal transmitters may be configured to transmit a signal with the same frequency. By transmitting the signal from multiple points, a stronger signal may be sent through the wearer's body, allowing for easier signal detection at the touchpad 604. Additionally, one or more of the signal transmitters may malfunction or may fail to couple to the wearer (such as when the wearer adjusts the position of the HMD on her head). As long as one of the signal transmitters functions as expected, a signal with the chosen frequency may still be received when the HMD wearer touches the touchpad 604.

In further examples, different types of capacitive sensors may be used to receive the signal from the wearer's fingers. For instance, the capacitive sensor could be a touchpad of a variety of different shapes and sizes. The touchpad could also contain different numbers and types of electrodes at various positions depending on the desired level of precision. By using more electrodes, sensing of manual input from the wearer may be more precise, particularly if the sensor is used to detect three-dimensional input.

In additional examples, the capacitive sensor may be a different type of sensor. For instance, rather than a touchpad, the capacitive sensor could be a single electrode. This type of sensor may simply detect whether or not it is being touched by a wearer of the device. Accordingly, the third signal may simply be a Boolean signal indicating whether or not the location on the device containing the electrode is being touched. Such a sensor could be used as a virtual button to carry out a variety of different functions, such as taking a picture, locking and unlocking the device, or turning the device off and on, for example.

In some examples, the capacitive sensor may be a single electrode that may be used to detect the distance of a user's finger from the HMD. Accordingly, the sensor may be used to output a signal indicating distance in the Z-direction only. Such a sensor may be useful to be able to separately detect both when a user is hovering over the electrode and also when the user is actually touching the electrode. For instance, a signal indicating that the user is hovering her finger over the electrode may be used to warm up a camera, and a signal indicating that the user is touching the electrode may be used to cause the camera to take a photograph.

Figure 6D:
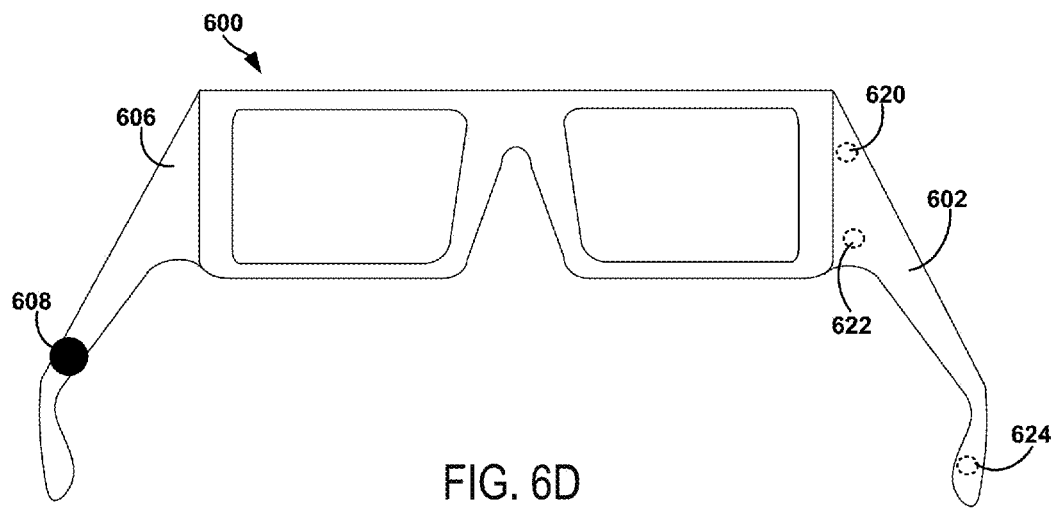
FIG. 6D illustrates an HMD with a capacitive sensor containing electrodes at multiple locations, according to an example embodiment.

In other examples, the capacitive sensor may consist of multiple separate electrodes positioned at different points on the HMD. For instance, FIG. 6D shows an HMD with a capacitive sensor that consists of three separate electrodes at separate locations, according to an example embodiment. A first electrode 620 may be positioned at a first location on the outside of a side-arm 602 of an HMD 600 as shown. Additionally, a second electrode 622 may be positioned at a second location on the outside of the side-arm 602 of an HMD 600. Further, a third electrode 624 may be positioned at a third location on the outside of the side-arm 602 of the HMD 600.

A sensor with electrodes positioned at different points on the HMD such as the one shown in FIG. 6D may be particularly useful for three-dimensional sensing. For instance, the distance to a user's finger from each of the electrodes 620, 622, 624 may separately be determined. Then, the position of the user's finger relative to the HMD can be determined by triangulating the user's finger. Accordingly, the three-dimensional position of the user's hand and/or fingers in space may be determined. Additional electrodes could be added at other points for more precise triangulations as well.

It should be understood that the above examples and the different configurations shown in the figures are meant for illustrative purposes, and are not intended to be limiting. Alternative shapes, sizes, positions, and types of signal transmitters, capacitive sensors, and wearable devices could be used with the disclosed methods and systems as well.

VII. Conclusion

It should be understood that the examples described with reference to an HMD are not limited to an HMD. It is contemplated that the example methods and systems described with reference to an HMD may be implemented on other types of wearable computing devices, such as wristbands, armbands, or finger-mounted devices, for instance.

Moreover, the above detailed description describes various features and functions of the disclosed systems, devices, and methods with reference to the accompanying figures. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

More generally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
   sending a first transmitted signal that has a first transmitted frequency from a signal transmitter, wherein the signal transmitter is positioned on a wearable computing device such that, when the wearable computing device is worn, the signal transmitter couples to a part of a wearer of the wearable computing device;
   receiving input signals at a self-capacitance touchpad located on the wearable computing device, the received input signals being indicative of manual input on the self-capacitance touchpad;
   determining that a first received input signal of the received input signals has a first received frequency that is different from the first transmitted frequency;
   based on determining that the first received input signal has the first received frequency that is different from the first transmitted frequency, refraining from operating the wearable computing device in accordance with the manual input indicated by the first received input signal;
   determining that a second received input signal of the received input signals has a second received frequency that matches the first transmitted frequency; and
   based on the determining that the second received input signal has the second received frequency that matches the first transmitted frequency, operating the wearable computing device in accordance with the manual input indicated by the second received input signal.

2. The method of claim 1, wherein the manual input comprises touch input.

3. The method of claim 1, wherein the manual input comprises three-dimensional input.

4. The method of claim 1, wherein the manual input comprises one or more non-contact gestures over the self-capacitance touchpad.

5. The method of claim 1, further comprising using the second received input signal to control a location of a graphical element on a display of the wearable computing device.

6. The method of claim 1, wherein the wearable computing device is a head-mountable device.

7. A wearable computing device, comprising:
   a signal transmitter positioned on the wearable computing device such that, when the wearable computing device is worn, the signal transmitter couples to a part of a wearer of the wearable computing device;
   a self-capacitance touchpad on the wearable computing device; and
   a control system configured to:
      cause the signal transmitter to send a first transmitted signal that has a first transmitted frequency;
      receive input signals at the self-capacitance touchpad, the received input signals being indicative of manual input on the self-capacitance touchpad;
      determine that a first received input signal of the received input signals has a first received frequency that is different from the first transmitted frequency;
      based on determining that the first received input signal has the first received frequency that is different from the first transmitted frequency, refrain from operating the wearable computing device in accordance with the manual input indicated by the first received input signal;

determine that a second received input signal of the received input signals has a second received frequency that matches the first transmitted frequency; and based on the determining that the second received input signal has the second received frequency that matches the first transmitted frequency, operate the wearable computing device in accordance with the manual input indicated by the second received input signal.

8. The wearable computing device of claim 7, wherein the manual input comprises touch input.

9. The wearable computing device of claim 7, wherein the manual input comprises three-dimensional input.

10. The wearable computing device of claim 7, wherein the manual input comprises one or more non-contact gestures over the capacitive sensor.

11. The wearable computing device of claim 7, further comprising one or more additional signal transmitters positioned on the wearable computing device such that, when the wearable computing device is worn, each of the one or more additional signal transmitters couples to a part of a wearer of the wearable computing device; and
wherein the control system is further configured to cause each of the one or more additional signal transmitters to send a respective signal that has the first transmitted frequency.

12. The wearable computing device of claim 7, comprising a head-mountable device.

13. The head-mountable device of claim 12, wherein the signal transmitter is positioned on an earpiece of the head-mountable device.

14. The head-mountable device of claim 12, wherein the signal transmitter is positioned on a nosepiece of the head-mountable device.

15. The head-mountable device of claim 12, wherein the signal transmitter is positioned on a first side-arm of the head-mountable device and the self-capacitance touchpad is positioned on a second side-arm of the head-mountable device.

16. The head-mountable device of claim 12, wherein the signal transmitter is positioned on an inside surface of a frame of the head-mountable device, and where the self-capacitance touchpad is positioned on an outside surface of the frame of the head-mountable computing device.

17. The head-mountable device of claim 16, wherein the signal transmitter is positioned on an inside surface of a first side-arm of the frame of the head-mountable device, and wherein the self-capacitance touchpad is positioned on an outside surface of a second side-arm of the frame of the head-mountable device.

18. A non-transitory computer readable storage medium having stored therein instructions, that when executed by a wearable computing device, cause the wearable computing device to perform functions comprising:

sending a first transmitted signal that has a first transmitted frequency from a signal transmitter, wherein the signal transmitter is positioned on the wearable computing device such that, when the wearable computing device is worn, the signal transmitter couples to a part of a wearer of the wearable computing device;

receiving input signals at a self-capacitance touchpad located on the wearable computing device, the received input signals being indicative of manual input on the self-capacitance touchpad;

determining that a first received input signal of the received input signals has a first received frequency that is different from the first transmitted frequency;

based on determining that the first received input signal has the first received frequency that is different from the first transmitted frequency, refraining from operating the wearable computing device in accordance with the manual input indicated by the first received input signal;

determining that a second received input signal of the received input signals has a second received frequency that matches the first transmitted frequency; and based on the determining that the second received input signal has the second received frequency that matches the first transmitted frequency, operating the wearable computing device in accordance with the manual input indicated by the second received input signal.

19. The non-transitory computer readable storage medium of claim 18, wherein the wearable computing device is a head-mountable device.

20. The device of claim 7, wherein the control system is further configured to:

determine that the second received input signal of the received input signals has a signal strength that falls within a certain range of signal strength that corresponds to a particular wearer of the wearable computing device; and further based on determining that the second received input signal of the received input signals has the signal strength that falls within the certain range of signal strength that corresponds to the particular wearer of the wearable computing device, operate the wearable computing device in accordance with the manual input indicated by the second received input signal.

21. The device of claim 7, wherein the control system is further configured to:

determine a predicted window of time when the first transmitted signal is predicted to pass through a wearer of the wearable computing device to reach the self-capacitance touchpad located on the wearable computing device;

determine that the second received input signal of the received input signals was received within the predicted window of time; and further based on determining that the second received input signal of the received input signals was received within the predicted window of time, operate the wearable computing device in accordance with the manual input indicated by the second received input signal.

* * * * *